Figure 1:
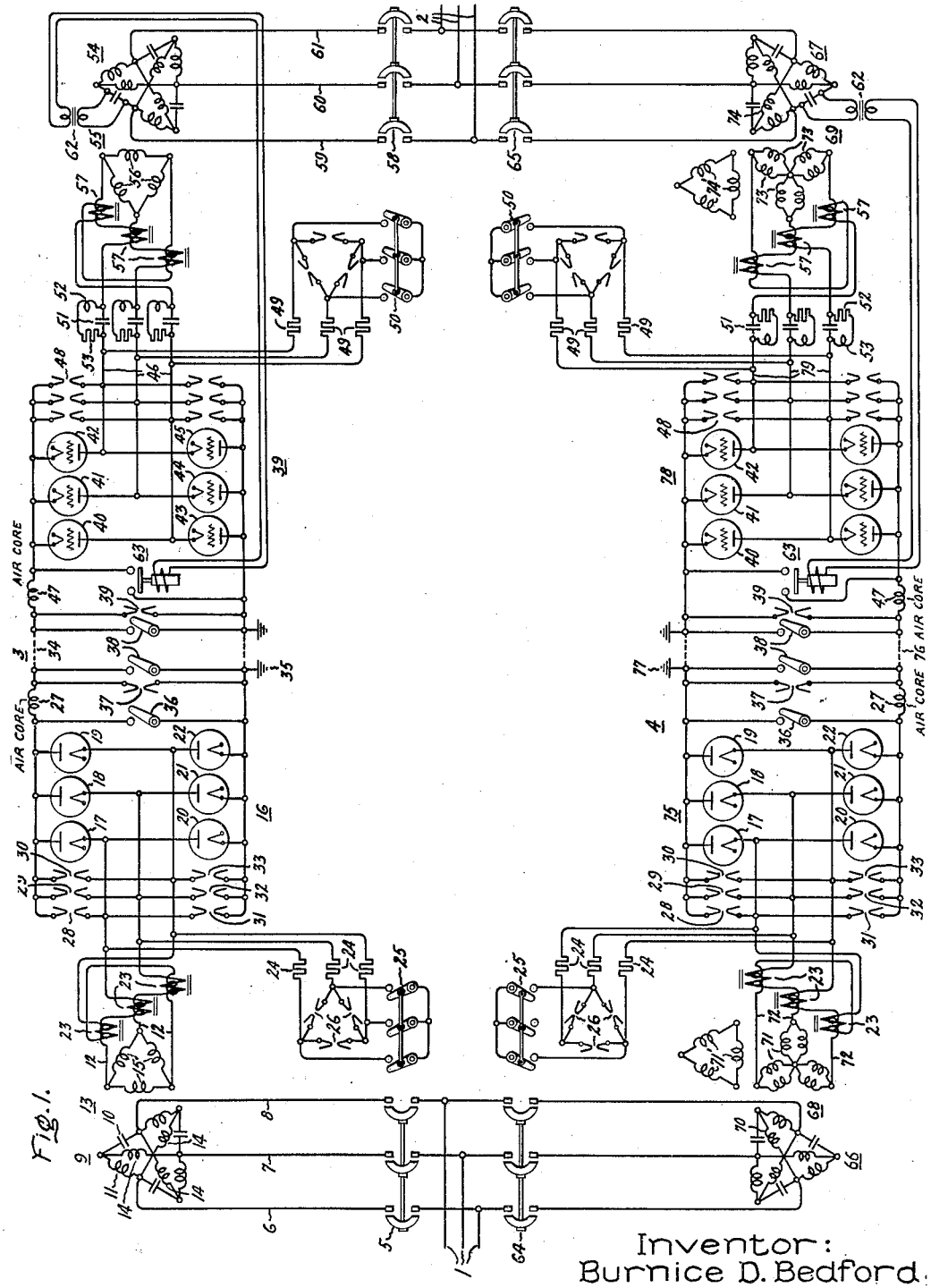

Aug. 9, 1938.  B. D. BEDFORD  2,126,604
ELECTRIC POWER TRANSMISSION
Original Filed Aug. 20, 1936  2 Sheets-Sheet 1

Inventor:
Burnice D. Bedford,
by Harry E. Dunham
His Attorney.

Aug. 9, 1938.   B. D. BEDFORD   2,126,604
ELECTRIC POWER TRANSMISSION
Original Filed Aug. 20, 1936   2 Sheets-Sheet 2
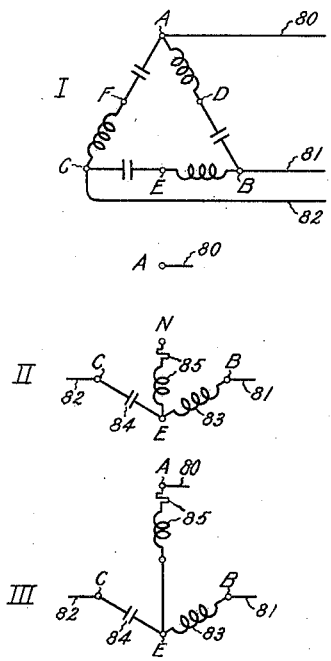
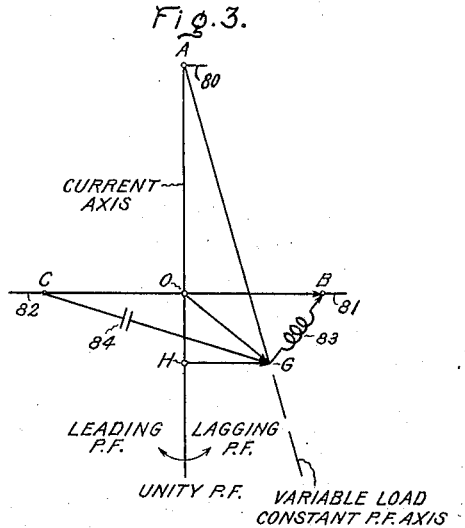
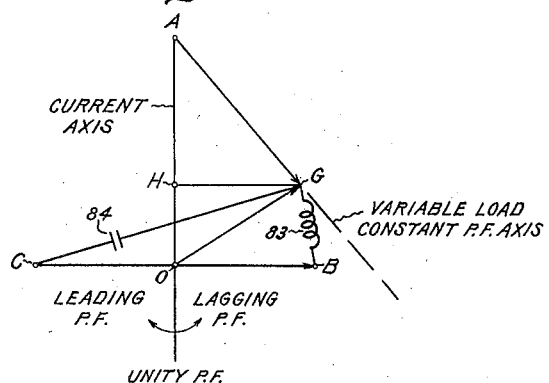
Inventor:
Burnice D. Bedford,
by Harry E. Dunham
His Attorney.

Patented Aug. 9, 1938

2,126,604

UNITED STATES PATENT OFFICE 2,126,604

ELECTRIC POWER TRANSMISSION

Burnice D. Bedford, Schenectady, N. Y., assignor to General Electric Company, a corporation of New York Application August 20, 1936, Serial No. 97,011
Renewed January 29, 1938

17 Claims. (Cl. 171—97)

My invention relates to electric power transmission and more particularly to circuits for transmitting electrical energy by direct current of constant value.

While my invention is generally applicable for use in connection with arrangements for transmitting energy between constant voltage alternating current circuits and constant current alternating current circuits, it is particularly applicable for use in high voltage direct current power transmission systems of the type described and claimed in U. S. Letters Patent No. 1,990,758 granted February 12, 1935 on an application of Charles W. Stone and assigned to the assignee of the present application. Briefly described, the system as disclosed in the Stone patent comprises a source of energy of constant voltage alternating current which is transformed to alternating current of constant value and then rectified by an alternating current rectifier for transmission at high voltage direct current. The constant direct current is transmitted over a transmission circuit to a receiver circuit, which includes an electric valve inverter for changing the transmitted energy to alternating current of constant value which is transformed to alternating current of constant voltage for distribution purposes or for connection with other constant voltage alternating current systems. The electric valve converting systems employ networks of the monocyclic type for transforming alternating current from constant voltage to constant current, or vice versa. These networks comprise reactances of opposite sign such as inductive reactances and capacitive reactances.

It is an object of my invention to provide a new and improved electric circuit for transforming constant voltage alternating current to alternating current of constant value.

It is another object of my invention to provide a new and improved electric circuit for transforming polyphase constant voltage alternating current to alternating current of constant value whereby there is provided a material improvement in the economy of the apparatus employed.

It is a further object of my invention to provide a new and improved electric valve converting system for transmitting electrical energy by means of direct current of constant value.

In accordance with the illustrated embodiment of my invention, I provide a new circuit arrangement for transforming constant voltage alternating current to alternating current of constant value. A monocyclic network, including a plurality of branches of two serially-connected reactances of opposite sign arranged to form a closed circuit, is energized from a polyphase constant voltage alternating current circuit by having phase conductors of the constant voltage circuit connected to alternate junctures of reactances of opposite sign. The constant current circuit is connected between the common juncture of reactances of opposite sign, exclusive of the alternate junctures, and the alternate juncture or associated phase conductor of the constant voltage circuit which has a voltage component perpendicular to the vector representing the voltage impressed on the branch of the network including the common juncture. By interconnecting the constant voltage alternating current circuit and the constant current alternating current circuit in this manner, I provide an arrangement for improving the economy in the apparatus employed as compared with the arrangements used heretofore.

In accordance with another illustrated embodiment of my invention, I provide an electric transmission system comprising circuit arrangements of the above described type in which the electrical energy is transmitted by means of a high voltage constant current direct current circuit, and in which a direct current circuit is energized by two constant current alternating current circuits operating in parallel.

For a better understanding of my invention, reference may be had to the following description taken in connection with the accompanying drawings, and its scope will be pointed out in the appended claims.

Fig. 1 of the accompanying drawings diagrammatically illustrates an embodiment of my invention as applied to an electric valve transmission system for transmitting electrical energy between two constant voltage alternating current circuits. Fig. 2 is a diagrammatical representation of simplified circuit arrangements to assist in explaining my invention, and Figs. 3 and 4 are diagrams representing certain operating characteristics of the embodiments of my invention diagrammatically shown in Figs. 1 and 2.

Fig. 1 of the accompanying drawings diagrammatically represents an embodiment of my invention as applied to an electric transmission system of the type described and claimed in the above mentioned Stone patent. For the purpose of explaining my invention, I have illustrated my invention as applied to a system for transmitting electrical energy between a constant voltage alternating current circuit 1 and a constant voltage alternating current circuit 2. The system comprises two circuits 3 and 4 each including constant current alternating current circuits and associated electric valve converting means for transmitting energy between the alternating current circuits 1 and 2. This type of transmission system in which a plurality of separate constant current alternating current circuits and associated electric valve means conjointly energize a direct current transmission system is described and claimed in a copending application for United States Letters Patent to Burnice D. Bedford et al., Serial No. 97,012 filed August 20, 1936, and assigned to the assignee of the present application. The circuit 3 may be connected to the alternating current circuit 1 through a circuit interrupter 5 and phase conductors 6, 7 and 8. In order to transform constant voltage alternating current to alternating current of constant value, I employ a monocyclic network 9 comprising a plurality of branches of serially-connected reactances of opposite sign, such as a capacitance 10 and an inductance 11, arranged to form a closed circuit and having alternate junctures of reactances of opposite sign connected to a different one of the phase conductors 6, 7 and 8.

I provide an arrangement for energizing a constant current alternating current circuit from the monocyclic network 9 by means of which material advantages may be derived in economy of apparatus and in operating characteristics. In particular, a constant current alternating current circuit 12 is energized from the monocyclic network 9 through a transformer 13 having primary windings 14 and delta-connected secondary windings 15. The constant current circuit 12, through the primary windings 14, is energized in accordance with certain voltages of the monocyclic network 9 to obtain the improvement in apparatus economy. Each of the primary windings 14 of the transformer 13 is energized in accordance with the voltage appearing between one of the common junctures of reactances of opposite sign, exclusive of the above mentioned alternate junctures, and the alternate juncture or phase conductor having a voltage impressed thereon which has a component of voltage perpendicular to the vector representing the voltage impressed on the branch of reactances of opposite sign including the common juncture. The current which flows in the primary windings 14 of transformer 13 will be alternating current of constant value and hence the current which flows in the secondary windings 15 of transformer 13 will also be alternating current of constant value so that this arrangement including the monocyclic network 9 and the transformer 13 serves to maintain polyphase alternating current of constant value in the constant current circuit 12.

An electric valve converting system 16 is connected to be energized from the constant current alternating current circuit 12 and serves to convert the alternating current of constant value to direct current of constant value. For the purpose of explaining the embodiment of my invention diagrammatically shown in this figure, the electric valve converting system 16 is shown as comprising electric valves 17–22, inclusive, preferably of the type employing ionizable mediums such as gases or vapors, arranged to effect full wave rectification of the alternating current of constant value so that the direct current output wave form will have a six-phase ripple. It should be understood that if it is desired to transmit energy in either direction between the alternating current circuits 1 and 2, it would be necessary to provide the electric valves 17–22 with control members so that the electric valve converting means 16 could operate as an inverter to convert direct current of constant value to alternating current of constant value. However, for the purpose of explaining this invention and to facilitate such explanation, the electric valve converting means has been shown as being arranged to operate only as a rectifier.

Interposed between the constant current alternating current circuit 12 and the electric valve converting means 16, there is connected in series relation with each phase conductor of the circuit 12 a saturable reactor 23 which is employed to control the rate of change of current through the associated electric valves near or at the end of the conduction periods to prevent the establishment of high voltage gradients within the electric valve means. These saturable reactors 23 offer a relatively small inductive reactance to the flow of current through the associated electric valve means at the beginning of the conduction intervals, but offer a substantially greater inductive reactance to the flow of current through the associated electric valve means near or at the end of the conduction intervals. This arrangement and system for controlling electric valve means of the type employing ionizable mediums is described and claimed in my copending application for United States Letters Patent Serial No. 97,010 filed August 20, 1936 and assigned to the assignee of the present application.

Connected across the constant current alternating current circuit 12 there is provided an arrangement for starting or controlling the electric valve transmission system, including resistances 24 and a suitable switching means 25. When the switch 25 is in the closed position, the resistances 24 are connected in a Y relationship across the alternating current circuit 12 so that an appreciable current flows through the resistances 24 and associated conductors to maintain the system voltages within predetermined limits during the starting operation. Any suitable voltage protective means such as devices 26, each including spaced electrodes, may be connected between the resistances 24 to limit the voltage appearing between the phase conductors of the alternating current circuit 12. This arrangement for starting and controlling an electric transmission system of this type and the method for starting and controlling an electric transmission system of this type are disclosed and claimed in a copending application for United States Letters Patent Serial No. 70,576 of Clodius H. Willis et al., filed March 24, 1936, now Patent No. 2,071,190, granted February 16, 1937, and assigned to the assignee of the present application.

Connected in series relation with the electric valve converting means 16, I employ an air core smoothing reactance 27. In order to protect the electric valve means 17–22, inclusive, from high voltage conditions which may exist in the circuit 3, I provide a plurality of voltage responsive or voltage protective means such as 28–33, inclusive, each including spaced electrodes and each associated with a different predetermined one of the electric valve means. The voltage protective devices 28–33, inclusive, are adjusted to respond to a predetermined voltage established by the voltage appearing across the air core reactance 27. It will be understood that since other apparatus employed in the circuit includes reactances having iron cores, the rate of change of voltage appearing across the air core reactance 27 will be greater than the rate of change of voltage appearing across the apparatus employing iron cores. Therefore, since the time constant of the air core reactance 27 is substantially smaller than the time constant of the other inductive apparatus employed in the circuit, the electric valves 17–22 will be protected against excessively high voltages in the transmission system. This arrangement for protecting electric valve means in systems of this nature is disclosed and claimed in a copending application for United States Letters Patent Serial No. 96,975 of Clodius H. Willis, filed August 20, 1936 and assigned to the assignee of the present application.

The electric valve converting means transmits direct current of constant value to a direct current transmission circuit 34. The positive terminal of the direct current circuit 34 is shown as being grounded through a suitable connection 35. A switch 36 is connected across the terminals of the electric valve converting means 16 and may be employed to short circuit the output of the electric valve converting means 16 during the starting operation or at any time when it is desired to limit the voltage of the system. Suitable voltage protective means, such as voltage protective devices 37, may also be connected across the terminals of the direct current circuit 34, and additional short circuiting switches 38 may be connected across the terminals of the direct current circuit 34 to start the system or to limit the voltage of the system.

In order to invert direct current of constant value to alternating current of constant value there is provided an electric valve converting means 39 comprising electric valves 40–45, inclusive, preferably of the type employing ionizable mediums such as gases or vapors, and each including an anode, a cathode and a control member. The electric valves 40–45, inclusive, operate in a predetermined order to transmit alternating current of constant value to a constant current circuit 46. The electric valves 40–45 are controlled and may be rendered conductive during predetermined intervals and in a predetermined order by means of any suitable control or excitation circuits. These circuits have not been shown in order to simplify the description of the electric valve converting means but it will be well understood by those skilled in the art that any of the conventional control circuits may be employed. I have found that the control circuit described and claimed in my copending application for United States Letters Patent, Serial No. 88,825, filed July 3, 1936 and assigned to the assignee of the present application, performs very satisfactorily. An air core inductive reactance 47 is connected in series relation between electric valve converting means 39 and the direct current circuit 34 and cooperates with voltage protective devices 48 to protect the electric valves 40–45, inclusive, from high voltages which may exist in the system. Resistances 49 and an associated switch 50 may be connected across the constant current alternating current circuit 46 and are employed to load the constant current circuit 36 to prevent the establishment of excessively high voltages, and also serves as a means for starting and controlling the transmission system.

In order to control the electric valves 40–45, inclusive, and to facilitate the current commutating function of these electric valves during a fault condition, I provide, connected in series relation with the phase conductors of the constant current circuit 46, capacitors 51. The function of these capacitors is to prevent the flow of appreciable direct current through the constant current alternating current circuit 46 in the event the operation of the electric valve converting means 39 becomes irregular. By so preventing or limiting the flow of direct current in the circuit 46 during abnormal operation, the electric valves 40–45, inclusive, are enabled to resume normal operation and to commutate the current in the normal predetermined manner. Any suitable means may be connected across the capacitors 51 to limit the voltage to which these capacitors are subjected. I employ any suitable means, such as a shunt connected path comprising a serially-connected inductance 52 and a resistance 53 which limits the voltage appearing between the plates of the capacitors by permitting a predetermined amount of charge to flow in the shunt circuit. This control and protective system is disclosed and claimed in a copending application for United States Letters Patent Serial No. 96,975 of Clodius H. Willis filed August 20, 1936 and assigned to the assignee of the present application.

At the receiving end of the circuit 3, I employ a monocyclic network 54 and a transformer 55, arranged in a manner similar to the monocyclic network 9 and transformer 13, for transforming alternating current of constant value to constant voltage alternating current. A primary winding 56 of transformer 44 is connected in delta and connected across the conductors of the constant current alternating current circuit 46. Interposed between the transformer 55 and the capacitors 51, I employ saturable reactors 57, similar in construction and arrangement to the above described reactors 23, which control the rate of change of current through the electric valves 40–45, inclusive. The monocyclic network 54 is connected to the constant voltage alternating current circuit 2 through a circuit interrupter 58 and through phase conductors 59, 60 and 61.

It will be understood that as the current supplied to the transmission system, or in other words as the current in the direct current circuit 34 tends to decrease, the transmission system, due to the operation of the monocyclic networks, tends to maintain a predetermined value of current. This condition causes the voltage of the system and particularly the voltage appearing in the monocyclic network to rise to excessively high values which may injuriously affect the other apparatus employed in the system. In order to prevent damage to the apparatus employed in the system, there is provided an arrangement for short circuiting the system in accordance with an electrical condition of the network 54 such as the voltage appearing across a capacitance in the monocyclic network 54. A potential transformer 62 which is energized in accordance with the voltage appearing across a capacitance of the monocyclic network is employed to energize any suitable voltage responsive device 63 or to energize any other suitable switching means to effect a short circuit of the electric valve converting means 39 when the voltage appearing across the capacitance exceeds a predetermined value. This arrangement for protecting a constant current alternating current system of this type is disclosed and claimed in a copending application for United States Letters Patent of Clodius H. Willis, Serial No. 96,975 filed August 20, 1936 and assigned to the assignee of the present application.

The electric circuit 4 of the electric power transmission system diagrammatically shown in Fig. 1 is substantially the same as circuit 3, with the exception of the transformer connections supplying the constant current alternating current circuits. Referring in particular to the circuit 4, a circuit interrupter 64 may be used to connect the circuit to the constant voltage alternating current circuit 1, and a circuit interrupter 65 may may used to connect the circuit to the constant voltage alternating current circuit 2. The circuit 4 is also provided at both the sending and receiving ends with monocyclic networks 66 and 67, and transformers 68 and 69, respectively. Considering transformer 68 as being located at the sending end of the circuit 4, primary windings 70 are connected to the proper points of the monocyclic network 66 to obtain the apparatus economy described above in connection with the monocyclic network 9. Secondary windings 71, each phase of which may comprise two parallel-connected secondary windings, are arranged to form a Y-connection and are connected to a constant current alternating current circuit 72. Tertiary windings 71' of transformer 68 are connected in delta and serve to suppress the third harmonic component, and multiples thereof in the current supplied to circuit 4. In like manner, the primary windings 73 of transformer 69 associated with monocyclic network 67 are arranged to form a Y-connection, and the secondary windings 74 are connected to the proper points in the monocyclic network 67 to obtain the above described apparatus economy. Tertiary windings 74' of transformer 69 are connected in delta to suppress the third harmonic component, and multiples thereof, of the current supplied by the circuit 4 to circuit 2. An electric valve converting means 75 is employed in the circuit 4 to convert alternating current of constant value to direct current of constant value and to effect energization of the constant current direct current transmission circuit 76 having the negative terminal thereof connected to ground through a suitable connection 77. An electric valve converting means 78 converts the direct current of constant value to alternating current of constant value and effects energization of a constant current alternating current circuit 79. The other elements of the circuit 4 have been assigned reference numerals corresponding to the elements in circuit 3 performing the same circuit functions and, in order to facilitate an explanation of my invention, will not be described in detail.

The operation of the embodiment of my invention, comprising the arrangement whereby an improved apparatus economy is obtained for transmitting electrical energy between a polyphase constant voltage alternating current circuit and a constant current alternating current circuit through a monocyclic network, may be best explained by considering the simplified circuits as shown in Fig. 2 of the accompanying drawings. Diagram I of Fig. 2 diagrammatically represents a monocyclic network employing a plurality of branches of reactances of opposite sign such as capacitances and inductances arranged to form a closed circuit and having alternate junctures, such as junctures A, B and C connected to a polyphase constant voltage alternating current circuit through suitable phase conductors 80, 81 and 82. As will be well understood by those skilled in the art, a circuit or circuits connected between common junctures D, E and F will have maintained therein, by virtue of the characteristics of the monocyclic network, an alternating current of constant value. Referring to Diagram II of Fig. 2 where only one branch of the monocyclic network is considered, the serially-connected inductance 83 and the capacitance 84 are connected between phase conductors 81 and 82, and the common juncture between inductance 83 and capacitance 84 is considered as being connected to the point of neutral potential N through any load impedance 85. When the constant current alternating current circuit is connected between points D, E and F, of Diagram I, the maximum potential perpendicular to the vector representing the voltage impressed on the branch including inductance 83 and capacitance 84, or in other words the maximum voltage which acts in phase with the constant current vector, is the voltage to neutral. Considering now Diagram III of Fig. 2, I have shown a simplified circuit connected in accordance with my invention wherein the inductance 83 and capacitance 84 are connected between phase conductors 81 and 82, and in which the common juncture E of inductance 83 and capacitance 84 is connected to the conductor 80 through the load impedance 85. By virtue of this connection, it will be understood that I materially increase the component of voltage perpendicular to the vector representing the voltage appearing between conductors 81 and 82, and thereby increase the voltage provided by the arrangement for maintaining constant current in the load impedance 85. Coincidentally with this increase in voltage, which serves to maintain constant current in the associated constant current load circuits, it will be understood that there is provided a material improvement in apparatus economy as concerns ratings of the inductances and capacitances employed in the monocyclic circuits or networks.

Referring now to Fig. 3 which shows certain operating characteristics of apparatus arranged in accordance with my invention, one branch of the monocyclic network is considered as being connected between phase conductors 81 and 82 and the voltage appearing between these conductors may be considered as represented by the vector CB. It will be assumed for the purpose of explaining the operation of this arrangement that the electric valve means associated with the constant current circuit, such as the electric valve means 16 in circuit 3 of Fig. 1, is operating as a rectifier and that the load supplied by one phase of the constant current circuit 12 may be defined by the point G. The voltage appearing across the capacitance 84 may, therefore, be represented by the vector CG and the voltage appearing across the inductance 83 may be represented by the vector GB. As will be well understood by those skilled in the art, the current may at all times be considered as represented by a vector AO which is perpendicular to the vector CB representing the voltage impressed on the serially-connected capacitance 84 and the inductance 83. By virtue of the arbitrary choice of the point G representing the load supplied by the constant current circuit, this load must be an inductive load since the vector AG representing the voltage impressed on the constant current circuit leads the current as represented by the vector AO. The total voltage AG impressed on the constant current load circuit is the resultant of the voltage component AO derived from the constant voltage alternating current circuit including conductors 80, 81 and 82, and the constant current voltage as represented by vector OG which is provided by the serially-connected inductance 83 and capacitance 84. It will be understood that as the impedance of the constant current circuit varies, the power factor remaining constant, the point G will move along the axis referred to in Fig. 3 as the variable load, constant power factor axis. It will be further understood that as the power factor of the load changes, the point G will swing to the right or to the left and that when the load point G swings to the left of the unity power factor axis, the current will lead the voltage. The vector HG represents the component of the total voltage impressed on the constant current circuit which is required by the inductive reactance of the load circuit. Fig. 4 also represents the operating characteristics of one phase of the monocyclic network when the network is supplying energy to an electric valve means operating as a rectifier. The load point G has been chosen to represent a load of smaller magnitude and having a greater lagging power factor angle than that represented by point G in Fig. 3. It will be understood that as the load decreases along a constant power factor axis, the circuit performs to maintain constant current within the load circuit and at substantially short circuit condition the point G coincides with point O so that the voltage between junctures A and C is impressed on capacitance 84.

It will be understood that by virtue of my invention I have provided an arrangement whereby a material improvement may be obtained in the economy of apparatus employed in the monocyclic networks, and that because of this economy there is provided an arrangement for obtaining a better utilization of the apparatus employed in an electric power transmission system of the nature shown in Fig. 1.

As a further feature of the transmission circuit shown in Fig. 1, it will be noted that the electric circuits 3 and 4 operate substantially as two independent circuits to supply energy to the constant current alternating current circuit 2 from the constant voltage alternating current circuit 1, and that by virtue of the monocyclic networks 9 and 66 and the connections of the secondary windings 15 and 71 of transformers 13 and 68, respectively, the ripple in the wave form of the direct current transmitted by the circuits 34 and 76 is substantially a twelve-phase ripple although the electric valve means 16 and 75 are only three-phase full wave rectifiers. The electric valve means 16 and 75 each operate independently as full wave rectifiers but since the secondary winding 15 of transformer 13 is connected in delta and the secondary windings 71 of transformer 68 are connected in Y the respective phase currents of the constant current alternating current circuits 12 and 72 are displaced 60 electrical degrees, and as a result thereof the resultant ripple in the wave form of the current in transmission system conductors 34 and 76 is substantially decreased to that corresponding to a twelve-phase rectifier. This feature offers a considerable advantage since it materially reduces the interference effect on communication circuits.

Considering further the operating characteristics of the electric transmission system comprising circuits 3 and 4, the delta-connected secondary windings 15 and 56 of transformers 13 and 55, respectively, in circuit 3, and the delta-connected tertiary windings 71' and 74' of transformers 68 and 69, respectively, of circuit 4, serve as a means for suppressing the third harmonic components, and multiples thereof, of the current in the constant current alternating current circuits. The circuit arrangements diagrammatically illustrating an embodiment of my invention as shown in Diagram III of Fig. 2 and in the monocyclic network arrangements of Fig. 1 are of particular importance in regard to the manner in which this arrangement decreases the ratio of the harmonic components of current to the fundamental component of current in the associated constant voltage alternating current systems. By virtue of the operation of the electric valve means employed in systems of this nature, the wave form of the current conducted by the individual electric valves is substantially rectangular and as a result thereof numerous harmonic components of current are present in the constant current alternating current circuits. The above referred to delta-connected secondary windings 15 and 56 of transformers 13 and 55 and the delta-connected tertiary windings 71' and 74' of transformers 68 and 69 serve to suppress the third harmonic components of current, and multiples thereof, so that these components are not present in the constant voltage alternating current systems. By virtue of my invention whereby the voltage of the circuit acting in phase with the current axis is materially increased, the ratio of the other harmonic components of current to the fundamental component of current in the constant voltage circuit will be substantially less than that of the prior art arrangements since a larger component of the voltage of the constant voltage circuit is employed to energize the constant current circuit. As a result thereof, there will be a greater percentage of the total current in phase with the voltage of the constant voltage alternating current circuit to effect a reduction in the ratio between the harmonic components of current and the fundamental component of current.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a polyphase constant voltage alternating current circuit, means for transforming constant voltage alternating current to alternating current of constant value comprising two serially-connected reactances of opposite sign connected between two phase conductors of said alternating current circuit, and a constant current alternating current circuit connected between the common juncture of said reactances of opposite sign and another phase conductor of said constant voltage circuit having a voltage component perpendicular to the voltage vector between said two phase conductors.

2. In combination, a polyphase constant voltage alternating current circuit, a pair of serially-connected reactances of opposite sign connected between two phase conductors of said alternating current circuit, and a constant current alternating current circuit connected between the common juncture of said reactances of opposite sign and another phase conductor of said constant voltage-circuit for impressing on said constant current circuit a voltage which is the resultant of a component of voltage perpendicular to the voltage vector between said first mentioned conductors and the voltage provided by said serially-connected reactances of opposite sign for maintaining constant current in said constant current circuit.

3. In combination, a polyphase constant voltage alternating current circuit, a pair of serially-connected reactances of opposite sign connected between two phase conductors of said alternating current, and a constant current alternating current circuit having impressed thereon a voltage for maintaining constant current therein and being connected between the common juncture of said reactances of opposite sign and another phase conductor of said constant voltage circuit, said voltage being the resultant of the voltage due to said reactances of opposite sign and a component of voltage which is perpendicular to the voltage vector between said first mentioned conductors and of a magnitude greater than the voltage from said juncture to the neutral of said constant voltage circuit.

4. In combination, a polyphase constant voltage alternating current circuit, a monocyclic network for transforming constant voltage alternating current to alternating current of constant value including a plurality of branches of two serially-connected reactances of opposite sign arranged to form a closed circuit and having alternate junctures of reactances of opposite sign connected to said constant voltage alternating current circuit, and a polyphase constant current alternating current circuit having each phase energized in accordance with the voltage existing between a different one of said alternate junctures and another juncture of reactances of opposite sign to impress on each phase a voltage which is the resultant of the constant current voltage provided by the branch including said another juncture and a component of voltage perpendicular to the voltage vector impressed on said branch.

5. In combination, a three phase constant voltage alternating current circuit, a monocyclic network for transforming constant voltage alternating current to alternating current of constant value including three branches of two serially-connected reactances of opposite sign arranged to form a closed circuit and having alternate junctures of reactances of opposite sign connected to said constant voltage alternating current circuit, and a three phase constant current alternating current circuit having each phase energized in accordance with the voltage existing between a different one of said alternate junctures and the juncture of reactances of opposite sign of the branch connected between the other two of said alternate junctures.

6. In combination, a polyphase constant voltage alternating current circuit, means comprising two serially-connected reactances of opposite sign connected between two phase conductors of said constant voltage alternating current circuit, a constant current alternating current circuit, and means energized in accordance with the voltage appearing between the common juncture of said reactances of opposite sign and another phase conductor having a component of voltage perpendicular to the voltage vector between said two phase conductors for maintaining constant current in said constant current circuit.

7. In combination, a three phase constant voltage alternating current circuit, means for transforming constant voltage alternating current to alternating current of constant value comprising two serially-connected reactances of opposite sign connected between two phase conductors of said alternating current circuit, a constant current alternating current circuit, and means energized in accordance with the voltage appearing between the other of said phase conductors and the juncture of said reactances for introducing in said constant current a component of potential substantially perpendicular to the voltage vector between said two conductors to assist the voltage provided by said serially-connected reactances of opposite sign.

8. In combination, a three phase constant voltage alternating current circuit, a monocyclic network comprising three branches of serially-connected reactances of opposite sign arranged to form a closed circuit and having alternate junctures of reactances of opposite sign connected to different phase conductors of said constant voltage alternating current circuit, a second three phase alternating current circuit, and means interposed between said network and said second circuit comprising a transformer having respective primary phase windings connected across a different one of the phase conductors of said constant voltage circuit and the common juncture of the reactances of opposite sign of the branch energized in accordance with the voltage of the other two phase conductors and having the respective secondary phase windings connected to said second three phase alternating current circuit to maintain constant current therein.

9. In combination, a three phase constant voltage alternating current circuit, a monocyclic network comprising three branches of serially-connected reactances of opposite sign arranged to form a closed circuit and having alternate junctures of reactances of opposite sign connected to different phase conductors of said constant voltage alternating current circuit, a second three phase alternating current circuit, and means interposed between said network and said second circuit comprising a transformer having respective primary phase windings connected across a different one of the phase conductors of said constant voltage circuit and the common juncture of the reactances of opposite sign of the branch connected between the other two phase conductors and having the respective secondary phase windings connected in delta and connected to said second three phase circuit to maintain constant current therein.

10. In combination, a polyphase constant voltage alternating current circuit, means for transforming constant voltage alternating current to alternating current of constant value comprising two serially-connected reactances of opposite sign connected between two of the phase conductors of said alternating current circuit, a constant current alternating current circuit connected between the common juncture of said reactances of opposite sign and another phase conductor of said constant voltage circuit having a voltage component perpendicular to the voltage vector between said two conductors, a direct current circuit, and electric valve means interposed between said constant current alternating current circuit and said direct current circuit for converting alternating current of constant value to direct current of constant value.

11. In combination, a polyphase constant voltage alternating current circuit, a constant current alternating current circuit, means for maintaining constant current in said constant current circuit comprising two serially-connected reactances of opposite sign connected between two of the phase conductors of said constant voltage alternating current circuit, means energized in accordance with the voltage appearing between the common juncture of said reactances of opposite sign and another phase conductor having a component of voltage perpendicular to the voltage vector between said two conductors, a constant current direct current circuit, and electric valve means interposed between said constant current alternating current circuit and said direct current circuit for transmitting energy between said constant current alternating current circuit and said constant current direct current circuit.

12. In combination, a polyphase constant voltage alternating current circuit, a monocyclic network for transforming constant voltage alternating current to alternating current of constant value including a plurality of branches of two serially-connected reactances of opposite sign arranged to form a closed circuit and having alternate junctures of reactances of opposite sign connected to said constant voltage alternating current circuit, a polyphase constant current alternating current circuit having each phase energized in accordance with the voltage existing between a different one of said alternate junctures and another juncture of reactances of opposite sign to impress on each phase a voltage which is the resultant of the constant current voltage provided by the branch including said another juncture and a component of voltage perpendicular to the voltage vector impressed on said branch, a constant current direct current circuit, and electric valve means interposed between said constant current alternating current circuit and said direct current circuit for transmitting energy therebetween.

13. In combination, a three phase constant voltage alternating current circuit, a second three phase alternating current circuit, means for maintaining constant current in said second circuit comprising a monocyclic network including three branches of serially-connected reactances of opposite sign arranged to form a closed circuit and having alternate junctures of reactances of opposite sign connected to different phase conductors of said constant voltage alternating current circuit and a transformer having respective primary phase windings connected across a different one of the phase conductors of said constant voltage circuit and the common juncture of the reactances of opppsite sign of the branch energized in accordance with the voltage of the other two phase conductors and having the respective secondary phase windings connected in delta and connected to said second three phase circuit, a direct current circuit, and electric valve means interposed between said second alternating current circuit and said direct current circuit for converting alternating current of constant value to direct current of constant value.

14. In combination, a three phase constant voltage alternating current circuit, a second three phase alternating current circuit, means for maintaining constant current in said second circuit comprising a monocyclic network including three branches of serially-connected rectances of opposite sign arranged to form a closed circuit and having alternate junctures of reactances of opposite sign connected to the phase conductors of said constant voltage alternating current circuit and a transformer having respective primary phase windings connected across a different one of the phase conductors of said constant voltage circuit and the common juncture of the reactances of opposite sign of the branch energized in accordance with the voltage of the other two phase conductors and having respective secondary phase windings connected in Y and connected to said second three phase circuit and having tertiary windings connected in delta, a direct current circuit, and electric valve means interposed between said second alternating current circuit and said direct current circuit for converting alternating current of constant value to direct current of constant value.

15. In combination, a three phase constant voltage alternating current circuit, a direct current circuit for transmitting electrical energy at constant current, and two circuits for energizing said direct current circuit from said three phase constant voltage alternating current circuit, each of said two circuits comprising a monocyclic network including three branches of serially-connected reactances of opposite sign arranged to form a closed circuit and having alternate junctures of reactances of opposite sign connected to phase conductors of said constant voltage alternating current circuit, a three phase constant current alternating current circuit each phase being energized in accordance with the voltage appearing between a different one of said phase conductors of said constant voltage circuit and the common juncture of the reactances of opposite sign of the branch connected between the other two phase conductors, and electric valve means interposed between said constant current alternating current circuit and said direct current circuit for converting alternating current of constant value to direct current of constant value.

16. In combination, a three phase constant voltage alternating current circuit, a direct current circuit for transmitting electrical energy at constant current, and two circuits interposed between said three phase alternating current circuit and said direct current circuit, one of said two circuits comprising means for transforming constant voltage alternating current to alternating current of constant value including a monocyclic network comprising three branches of serially-connected reactances of opposite sign arranged to form a closed circuit and having alternate junctures of reactances of opposite sign connected to phase conductors of said constant voltage alternating current circuit, a transformer having respective primary phase windings connected across a different one of said phase conductors of said constant voltage circuit and the common juncture of the reactances of the branch connected between the other two phase conductors and having the respective secondary phase windings connected in delta, a constant current alternating current circuit energized from said secondary windings of said transformer and electric valve means interposed between said constant current alternating current circuit and said direct current circuit for converting alternating current of constant value to direct current of constant value and having one terminal grounded, and the other of said two circuits comprising means for transforming constant voltage alternating current to alternating current of constant value including a monocyclic network comprising three branches of serially-connected reactances of opposite sign arranged to form a closed circuit and having alternate junctures of reactances of opposite sign connected to the phase conductors of said constant voltage alternating current circuit, a transformer having respective primary windings connected across a different one of the phase conductors of said constant voltage circuit and the common juncture of reactances of opposite sign of the branch connected between the other two phase conductors and having the respective secondary phase windings connected in Y, a constant current alternating current circuit energized from said Y-connected secondary windings and electric valve means interposed between said constant current alternating current circuit and said direct current circuit for converting alternating current of constant value to direct current of constant value and having the terminal of a polarity opposite to that of said grounded terminal connected to ground.

17. In combination, a polyphase constant voltage alternating current circuit, a second polyphase constant voltage alternating current circuit, and two circuits for transmitting energy between said constant voltage alternating current circuits, each of said circuits including means connected to said first mentioned polyphase constant voltage alternating current circuit for transforming constant voltage alternating current to alternating current of constant value, comprising a monocyclic network including a plurality of branches of serially-connected reactances of opposite sign arranged to form a closed circuit and having alternate junctures of reactances of opposite sign connected to phase conductors of said first mentioned constant voltage circuit, a constant current alternating current circuit, transforming means interposed between said monocyclic network and said constant current alternating current circuit and being energized in accordance with the voltage appearing between a common juncture of reactances of opposite sign and the phase conductor of said first mentioned constant voltage circuit of a voltage having a component substantially perpendicular to the branch including the said common juncture, electric valve means connected to said constant current alternating current circuit, a constant current direct current circuit energized from said electric valve means, an electric valve means for inverting constant current direct current to alternating current of constant value, means interposed between said second mentioned constant current alternating current circuit and said second mentioned constant voltage circuit for transforming constant current alternating current to constant voltage alternating current, said transforming means in each of said two circuits being arranged so that the currents of the respective phases of the first mentioned constant current alternating current circuits have a predetermined phase displacement relative to each other.

BURNICE D. BEDFORD.